United States Patent
Itoh et al.

(10) Patent No.: US 8,193,303 B2
(45) Date of Patent: Jun. 5, 2012

(54) METHOD FOR PRODUCTION OF PLASTIC LENS

(75) Inventors: Shinsuke Itoh, Shinjyuku-ku (JP); Masahisa Kousaka, Shinjyuku-ku (JP)

(73) Assignee: Hoya Corporation, Tokyo (JP)

( * ) Notice: Subject to any disclaimer, the term of this patent is extended or adjusted under 35 U.S.C. 154(b) by 144 days.

(21) Appl. No.: 12/597,554

(22) PCT Filed: Apr. 25, 2008

(86) PCT No.: PCT/JP2008/058050
§ 371 (c)(1),
(2), (4) Date: Dec. 31, 2009

(87) PCT Pub. No.: WO2008/136401
PCT Pub. Date: Nov. 13, 2008

(65) Prior Publication Data
US 2010/0137555 A1    Jun. 3, 2010

(30) Foreign Application Priority Data

Apr. 27, 2007 (JP) ................................. 2007-118612

(51) Int. Cl.
*C08G 75/04* (2006.01)
(52) U.S. Cl. ............ 528/375; 528/9; 528/377; 528/393; 351/159
(58) Field of Classification Search .................. 528/375, 528/9, 377, 393; 531/159
See application file for complete search history.

(56) References Cited

U.S. PATENT DOCUMENTS

| | | | |
|---|---|---|---|
| 6,531,532 B1 | 3/2003 | Yoshimura et al. | |
| 2004/0254258 A1* | 12/2004 | Horikoshi et al. | 523/102 |
| 2005/0062932 A1 | 3/2005 | Kosaka et al. | |

FOREIGN PATENT DOCUMENTS

| | | |
|---|---|---|
| EP | 1 326 095 A1 | 7/2003 |
| EP | 1 348 726 A1 | 10/2003 |
| EP | 1 369 709 A2 | 12/2003 |
| EP | 1 369 709 A3 | 12/2003 |
| EP | 1 518 873 A2 | 3/2005 |
| EP | 1 518 873 A3 | 3/2005 |
| JP | 9 110979 | 4/1997 |
| JP | 2001 2783 | 1/2001 |
| JP | 2004 197005 | 7/2004 |
| JP | 2005 121679 | 5/2005 |
| JP | 2005 281527 | 10/2005 |
| JP | 2007 093862 | 4/2007 |

* cited by examiner

*Primary Examiner* — Randy Gulakowski
*Assistant Examiner* — Shane Fang
(74) *Attorney, Agent, or Firm* — Oblon, Spivak, McClelland, Maier & Neustadt, L.L.P.

(57) ABSTRACT

A process for producing a plastic lens which comprises preparing a prepolymer comprising sulfur by bringing at least one compound having epithio group, sulfur and a portion of a polythiol compound into reaction with each other and, thereafter, adding rest of the polythiol compound to the prepared prepolymer comprising sulfur and allowing polymerization to proceed. A plastic lens of excellent quality which exhibits excellent weatherability in combination with a great refractive index, a great Abbe number and excellent transparency is produced.

9 Claims, No Drawings

METHOD FOR PRODUCTION OF PLASTIC LENS

CROSS-REFERENCE TO RELATED APPLICATIONS

This application is a 371 of PCT/JP08/058,050 filed Apr. 25, 2008 and claims the benefit of JP 2007-118612 filed Apr. 27, 2007.

TECHNICAL FIELD

The present invention relates to a process for producing a plastic lens and, more particularly, to a process for producing a plastic lens which exhibits excellent weatherability in combination with a great refractive index, a great Abbe number and excellent transparency.

BACKGROUND ART

Plastic lenses are used for various optical applications such as spectacle lenses since plastic lenses have lighter weight, are less easily broken and can be more easily dyed than inorganic lenses.

Typical examples of the material for the plastic lenses include polydiethylene glycol bisallylcarbonate (referred to as CR-39, occasionally).

However, CR-39 has a refractive index of about 1.50 which is smaller than those of inorganic glasses, and a drawback arises in that the thickness of the lens is increased at edge portions in minus-power lenses and at the central portion in plus-power lenses.

Therefore, development of a plastic material having a greater refractive index has been conducted to obtain plastic lenses having a smaller weight and a smaller thickness.

As the process for increasing the refractive index, various processes such as a process of introducing an aromatic ring, a process of introducing a halogen atom other than fluorine atom and a process of introducing sulfur have been proposed.

For example, in Patent Reference 1, a process in which a plastic lens having refractive index of 1.70 or greater and an Abbe number of 35 or greater is obtained by polymerizing a compound having two or more epithio group in one molecule, is disclosed.

In Patent Reference 2, a process in which, in order to further increase the refractive index, a plastic lens having a great refractive index and a great Abbe number is obtained by polymerizing and curing a composition for optical materials comprising a mixture of a compound having sulfur such as an epithio compound and an inorganic compound having sulfur atom and/or selenium atom using a curing catalyst, is disclosed.

In the case of the optical material described in Patent Reference 2, the inorganic compound having sulfur atom and/or selenium atom is frequently a solid component. Therefore, a problem arises in that obtaining a uniform optical material exhibiting excellent transparency is difficult since the compound is separated when the composition is formed or is not completely dissolved when the compound is used in a great concentration.

In Patent Reference 3, a process in which an optical material exhibiting excellent transparency is obtained by preliminarily polymerizing a composition which comprises prescribed relative amounts by weight of an inorganic compound having sulfur atom and/or selenium atom, an organic compound having sulfur reactive with the inorganic compound such as an epithio compound and a compound promoting the reaction of the inorganic compound and the organic compound having sulfur to obtain a composition for a resin, followed by polymerizing and curing the obtained composition for a resin, is disclosed.

[Patent Reference 1] Japanese Patent Application Laid-Open No. Heisei 9 (1997)-110979
[Patent Reference 2] Japanese Patent Application Laid-Open No. 2001-2783
[Patent Reference 3] Japanese Patent Application Laid-Open No. 2004-197005

DISCLOSURE OF THE INVENTION

In accordance with the process described in Patent Reference 3, it is necessary that the substance for promoting the reaction be added in a great amount in the preliminary polymerization to promote the reaction between the inorganic compound having sulfur atom and/or selenium atom and the compound having sulfur reactive with the inorganic compound.

However, weatherability (light resistance) of the lens obtained after the molding is occasionally decreased by the effect of the added substance for promoting the reaction.

In particular, when an aromatic heterocyclic compound having nitrogen such as an imidazole-based compound is used in a great amount, a problem arises in that weatherability is decreased to a great degree.

The present invention has been made under the above circumstances and has an object of providing a process for producing a plastic lens in which the amount of the substance for promoting the reaction added in the preliminary polymerization can be decreased.

The present invention has also an object of providing a process for producing a plastic lens of excellent quality which exhibits excellent weatherability in combination with a great refractive index, a great Abbe number and excellent transparency in accordance with the above process.

The present invention has also an object of providing a plastic lens for spectacles produced in accordance with the above processes.

As the result of intensive studies by the present inventors to achieve the above objects, it was found that a plastic lens of excellent quality which exhibits excellent weatherability in combination with a great refractive index, a great Abbe number and excellent transparency could be obtained by preparing a prepolymer comprising sulfur by bringing at least one compound having epithio group, sulfur and a portion of a polythiol compound into reaction with each other and, thereafter, adding the rest of the polythiol compound to the prepared prepolymer comprising sulfur and allowing the polymerization to proceed.

The present invention has been completed based on the above knowledge.

The present invention provides:
1. A process for producing a plastic lens which comprises preparing a prepolymer comprising sulfur by bringing at least one compound having epithio group, sulfur and a portion of a polythiol compound into reaction with each other and, thereafter, adding the rest of the polythiol compound to the prepared prepolymer comprising sulfur and allowing polymerization to proceed;
2. A process for producing a plastic lens described above in 1., wherein the prepolymer comprising sulfur is prepared by bringing at least one compound having epithio group, sulfur and a portion of a polythiol compound into reaction with each other in presence of a vulcanization catalyst;

3. A process for producing a plastic lens described above in 2., wherein the vulcanization catalyst is at least one imidazole-based catalyst selected from 2-mercapto-N-methylimidazole, imidazole, N-methylimidazole, 2-methylimidazole, 4-methylimidazole, N-ethylimidazole, 2-ethylimidazole, 4-ethylimidazole, N-butylimidazole, 2-butylimidazole, 4-butylimidazole, N-phenylimidazole, 2-phenylimidazole, N-benzylimidazole, 2-benzyl-imidazole, 2-mercaptoimidazole and 2-mercaptobenzimidazole;
4. A process for producing a plastic lens described above in 2., wherein the vulcanization catalyst is at least one thiuram-based catalyst selected from tetramethylthiuram disulfide and tetramethylthiuram monosulfide;
5. A process for producing a plastic lens described above in 2., wherein the vulcanization catalyst is at least one guanidine-based catalyst selected from diphenylguanidine and di-o-tolylguanidine;
6. A process for producing a plastic lens described above in any one of 2. to 5., wherein an amount of the vulcanization catalyst is within a range of 0.001 to 5.0% by weight based on an amount of entire raw materials for preparing the prepolymer comprising sulfur;
7. A process for producing a plastic lens described above in any one of 1. to 6., wherein the polythiol compound is at least one compound selected from bis(mercaptomethyl)-1,4-dithiane, bis(mercaptoethyl)sulfide, bis(mercaptoethyl)disulfide, 1,2-bis(mercaptoethyl)thio-3-mercapto-propane, pentaerythritol tetrakismercaptoacetate, pentaerythritol tetrakismercaptopropionate, trimethylolpropane trismercaptoacetate, trimethylolpropane trismercaptopropionate and trimercaptopropane;
8. A process for producing a plastic lens described above in any one of 1. to 7., wherein an amount of the portion of a polythiol compound is in a range of 0.1 to 95% by weight based on an amount of entire polythiol compound;
9. A process for producing a plastic lens described above in any one of 1. to 8., wherein the compound having epithio group is at least one compound selected from bis($\beta$-epithiopropyl)sulfide, bis($\beta$-epithiopropyl)disulfide, bis($\beta$-epithiopropyl)ether, bis($\beta$-epithiopropyl)methane, 1,2-bis-($\beta$-epithiopropyl)ethane, 1,3-bis($\beta$-epithiopropyl)propane, 2,5-bis($\beta$-epithio-propyl)-1,4-dithiane, 1,3- and 1,4-bis($\beta$-epithiopropyl)cyclohexanes, 1,3- and 1,4-bis($\beta$-epithiopropyl)benzenes, bis[4-($\beta$-epithiopropylthio)phenyl]sulfide and bis[4-($\beta$-epithiopropylthio)cyclohexyl]sulfide;
10. A process for producing a plastic lens described above in any one of 1. to 9., wherein an amount of the compound having epithio group is in a range of 50 to 95% by weight based on an amount of entire raw materials for preparing the prepolymer comprising sulfur;
11. A process for producing a plastic lens described above in any one of 1. to 10., wherein the reaction for preparing the prepolymer comprising sulfur is terminated when a refractive index is increased to a prescribed value which is smaller than a refractive index of the plastic lens;
12. A process for producing a plastic lens described above in any one of 1. to 11., wherein a temperature in the reaction for preparing the prepolymer comprising sulfur is higher than the temperature in the polymerization of the prepolymer comprising sulfur and the rest of the polythiol compound; and
13. A plastic lens produced in accordance with a process described in any one of 1. to 12.

In accordance with the process for producing a plastic lens of the present invention, the amount of the vulcanization catalyst which causes a decrease in the weatherability of the lens can be decreased.

Since the prepolymer comprising sulfur can be prepared by the reaction at a low temperature in a short time even when the amount of the vulcanization catalyst is small, degradation such as discoloration due to heating during the preparation of the prepolymer can be suppressed.

Therefore, the plastic lens obtained as described above exhibits excellent weatherability in combination with a great refractive index, a great Abbe number and excellent transparency.

THE MOST PREFERRED EMBODIMENT TO CARRY OUT THE INVENTION

The present invention will be described specifically in the following.

The process for producing a plastic lens of the present invention comprises preparing a prepolymer comprising sulfur by bringing at least one compound having epithio group, sulfur and a portion of a polythiol compound into reaction with each other and, thereafter, adding the rest of the polythiol compound to the prepared prepolymer comprising sulfur and allowing the polymerization to proceed.

The process for preparing a prepolymer comprising sulfur of the present invention will be described in the following.

In the process for preparing a prepolymer comprising sulfur of the present invention, in general, at least one compound having epithio group, sulfur and a portion of a polythiol compound are mixed, formed into a solution and brought into reaction with each other.

Examples of the compound having epithio group include episulfide compounds having an alicyclic skeleton structure such as 1,3- and 1,4-bis($\beta$-epithiopropylthio)cyclohexanes, 1,3- and 1,4-bis($\beta$-epithiopropyl-thiomethyl)cyclohexanes, bis[4-($\beta$-epithiopropylthio)cyclohexyl]methane, 2,2-bis[4-($\beta$-epithiopropylthio)cyclohexyl]propane, bis[4-($\beta$-epithiopropyl-thio)cyclohexyl]sulfide and 1,3- and 1,4-bis($\beta$-epithiopropyl)cyclohexanes; episulfide compounds having an aromatic skeleton structure such as 1,3- and 1,4-bis($\beta$-epithiopropylthio)benzenes, 1,3- and 1,4-bis($\beta$-epithiopropyl-thiomethyl)benzenes, bis[4-($\beta$-epithiopropylthio)phenyl]methane, 2,2-bis-[4-($\beta$-epithiopropylthio)phenyl]propane, bis[4-($\beta$-epithiopropylthio)phenyl]sulfide, sulfide, 4,4-bis($\beta$-epithio-propylthio)biphenyl and 1,3- and 1,4-bis($\beta$-epithiopropyl)benzenes; episulfide compounds having a dithiane ring skeleton structure such as 2,5-bis($\beta$-epithiopropylthiomethyl)-1,4-dithiane, 2,5-bis($\beta$-epithiopropyl-thioethylthiomethyl)-1,4-dithiane, 2,5-bis($\beta$-epithiopropylthioethyl)-1,4-dithiane, 2,3,5-tri($\beta$-epithiopropylthioethyl)-1,4-dithiane and 2,5-bis-($\beta$-epithiopropyl)-1,4-dithiane; and episulfide compounds having an aliphatic skeleton structure such as 2-(2-$\beta$-epithiopropylthioethylthio)-1,3-bis($\beta$-epithiopropylthio)propane, 1,2-bis[(2-$\beta$-epithiopropylthioethyl)-thio]-3-($\beta$-epithiopropylthio)propane, tetrakis($\beta$-epithiopropylthiomethyl)-methane, 1,1,1-tris($\beta$-epithiopropylthiomethyl)propane, bis($\beta$-epithio-propyl)sulfide, bis($\beta$-epithiopropyl)disulfide, bis($\beta$-epithiopropyl)ether, bis($\beta$-epithiopropyl)methane, 1,2-bis($\beta$-epithiopropyl)ethane and 1,3-bis-($\beta$-epithiopropyl)propane.

Preferable examples of the compound having epithio group among the above compounds include bis($\beta$-epithiopropyl)sulfide, bis($\beta$-epithio-propyl)disulfide, bis($\beta$-epithiopropyl)ether, bis($\beta$-epithiopropyl)methane, 1,2-bis($\beta$-epithiopropyl)ethane, 1,3-bis($\beta$-epithiopropyl)propane, 2,5-bis-($\beta$-epithiopropyl)-1,4-dithiane, 1,3- and 1,4-bis($\beta$-epithiopropyl)-cyclohexanes, 1,3- and 1,4-bis($\beta$-epithiopropyl)benzenes, bis[4-($\beta$-epithio-propylthio)phenyl]sulfide and bis[4-($\beta$-epithiopropylthio)cyclohexyl]sulfide.

These compounds exhibit great Abbe numbers and great refractive indices and have viscosities facilitating handling.

Examples of the compound having epithio group which is most preferable as the material for a lens exhibiting excellent weatherability and a great refractive index include bis(β-epithiopropyl)sulfide, bis(β-epithiopropyl)disulfide and 2,5-bis(β-epithiopropyl)-1,4-dithiane.

The above compound having epithio group may be used singly or in combination of two or more.

The amount of the compound having epithio group used for preparing a prepolymer comprising sulfur is, in general, 50 to 95% by weight, preferably 60 to 95% by weight and more preferably 70 to 95% by weight based on the amount of the entire raw materials used for preparing the prepolymer comprising sulfur.

Sulfur is not particularly limited. Sulfur from which impurities having boiling points of 120° C. or lower have been removed and which has a purity of 98% by weight or greater is preferable.

When sulfur described above is used, coloration of the obtained plastic lens can be suppressed.

The process for removing impurities having boiling points of 120° C. or lower from sulfur is not particularly limited. For example, the impurities can be removed by heating sulfur under the atmospheric pressure or a reduced pressure, by recrystallizing sulfur by sublimation or by recrystallizing sulfur after melting by heating.

The amount of sulfur used for preparing a prepolymer comprising sulfur is, in general, 0.1 to 50% by weight, preferably 1 to 30% by weight and more preferably 10 to 30% by weight based on the amount of the entire raw materials used for preparing the prepolymer comprising sulfur.

Examples of the polythiol compound include compounds having sulfur atom in portions other than mercapto group and compounds having no sulfur atom in portions other than mercapto group such as methanedithiol, ethanedithiol, propanedithiol, 1,6-hexanedithiol, 1,2,3-trimercaptopropane, tetrakis(mercaptomethyl)methane, cyclo-hexanedithiol, 2,2-dimethylpropane-1,3-dithiol, 3,4-dimethoxybutane-1,2-dithiol, 2-methylcyclohexane-2,3-dithiol, bis(mercaptomethyl)cyclohexane, 2,3-dimercapto-1-propanol (2-mercaptoacetate), 2,3-dimercapto-1-propanol (3-mercaptoacetate), diethylene glycol bis(2-mercaptoacetate), diethylene glycol bis(3-mercaptopropionate), 1,2-dimercaptopropyl methyl ether, 2,3-dimercaptopropyl methyl ether, 2,2-bis (mercaptomethyl)-1,3-propanedithiol, bis(2-mercaptoethyl) ether, ethylene glycol bis(2-mercaptoacetate), ethylene glycol bis(3-mercaptopropionate), trimethylolpropane tris(2-mercaptoacetate), trimethylolpropane tris(3-mercaptopropionate), pentaerythritol tetrakis(2-mercaptoacetate), pentaerythritol tetrakis(3-mercaptopropionate), 1,2-bis(2-mercaptoethyl-thio)-3-mercaptopropane, bis(mercaptomethyl)sulfide, bis(mercaptoethyl)sulfide, bis(mercaptopropyl)sulfide, bis(mercaptomethylthio)methane, bis(2-mercaptoethylthio)methane, bis(3-mercaptopropyl)methane, 1,2-bis-(mercaptomethylthio)ethane, 1,2-(2-mercaptoethylthio)ethane, 1,2-(3-mercaptopropyl)ethane, 1,3-bis(mercaptomethylthio)propane, 1,3-bis(2-mercaptoethylthio)propane, 1,3-bis(3-mercaptopropylthio)propane, 1,2-bis-(2-mercaptoethylthio)-3-mercaptopropane, 2-mercaptoethylthio-1,3-propanedithiol, 1,2,3-tris(mercaptomethylthio)propane, 1,2,3-tris(2-mercaptoethylthio)propane, 1,2,3-tris(3-mercaptopropylthio)propane, tetrakis(mercaptomethylthiomethyl)methane, tetrakis(2-mercaptoethyl-thiomethyl)methane, tetrakis(3-mercaptopropylthiomethyl)methane, bis-(mercaptomethyl) disulfide, bis(mercaptoethyl)disulfide, bis(mercaptomethyl)-3,6,9-trithia-1,11-undecanedithiol, bis(1,3-dimercapto-2-propyl)sulfide, 3,4-thiophenedithiol, tetrahydrothiophene-2,5-dimercaptomethyl, 2,5-dimercapto-1,3,4-thiadiazole, 2,5-dimercapto-1,4-dithiane, 2,5-bis-(mercaptomethyl)-1,4-dithiane and 2,5-bis(mercaptoethyl)-1,4-dithiane.

Preferable examples of the polythiol compound among the above compounds include bis(mercaptomethyl)-1,4-dithiane, bis(mercaptoethyl)sulfide, bis(mercaptoethyl)disulfide, 1,2-bis(mercaptoethyl)thio-3-mercaptopropane, pentaerythritol tetrakismercaptoacetate, pentaerythritol tetrakismercaptopropionate, trimethylolpropane trismercaptoacetate, trimethylolpropane trismercaptopropionate and trimercaptopropane. These polythiol compounds provides excellent heat resistance.

The polythiol compound may be used singly or in combination of two or more.

The amount of the portion of the polythiol compound used for preparing a prepolymer comprising sulfur is 0.1 to 95% by weight and preferably 10 to 90% by weight based on the amount of the entire polythiol compound used for preparing the plastic lens.

When the amount of the portion of the polythiol compound used for preparing a prepolymer comprising sulfur is within the above range, the amount of the vulcanization catalyst can be decreased to a great degree, and the control of the vulcanization can be facilitated.

It is more preferable that the amount of the portion of the polythiol compound used for preparing a prepolymer comprising sulfur is 25 to 75% by weight since the time of the reaction for forming the prepolymer can be decreased, and the operation of termination of the reaction for forming the prepolymer can be facilitated.

Therefore, a plastic lens exhibiting uniform quality, excellent weatherability, a great refractive index, a great Abbe number, excellent transparency and excellent mechanical strength can be produced.

A vulcanization catalyst can be used for the above reaction. Examples of the vulcanization catalyst include imidazole-based vulcanization accelerators such as 2-mercapto-N-methylimidazole, imidazole, N-methylimidazole, 2-methylimidazole, 4-methylimidazole, N-ethylimidazole, 2-ethylimidazole, 4-ethylimidazole, N-butylimidazole, 2-butylimidazole, 4-butylimidazole, N-phenylimidazole, 2-phenylimidazole, N-benzylimidazole, 2-benzylimidazole, 2-mercaptoimidazole and 2-mercaptobenzimidazole; thiuram-based vulcanization accelerators such as tetramethylthiuram disulfide and tetramethylthiuram monosulfide; and guanidine-based vulcanization accelerators such as diphenylguanidine and di-o-tolylguanidine.

Among the above compounds, the imidazole-based catalysts described above are preferable as the vulcanization catalyst.

The amount of the vulcanization catalyst used for preparing a prepolymer comprising sulfur is 0.001 to 5.0% by weight, preferably 0.01 to 5.0% by weight and more preferably 0.01 to 1.0% by weight based on the amount of the entire raw materials used for preparing the prepolymer comprising sulfur.

When the amount is within the above range, the control of the vulcanization is facilitated, and a plastic lens exhibiting uniform quality, excellent weatherability and excellent transparency can be produced.

The temperature of the reaction is not particularly limited. The temperature is, in general, 10 to 80° C., preferably 30 to 80° C. and more preferably 40 to 70° C.

It is preferable that the temperature of the reaction is higher than the temperature of the reaction in the polymerization of the prepolymer comprising sulfur and the rest of the polythiol compound which is conducted in the following step.

As for the time of the reaction, it is preferable that the reaction is conducted, in general, for 1 to 24 hours, preferably for 1 to 8 hours and more preferably for 2 to 6 hours under stirring.

The reaction may be conducted under an inert gas such as nitrogen and a rare gas, under a vacuum or under the atmospheric pressure. It is preferable that the reaction is conducted under an inert gas such as nitrogen.

When the temperature of the reaction is within the above range, separation of unreacted sulfur in the prepolymer comprising sulfur is suppressed almost completely, and no cloudiness is formed in the obtained plastic lens.

The point at which the reaction for preparing the prepolymer comprising sulfur is terminated is suitably decided with consideration on the separation of sulfur in the obtained prepolymer comprising sulfur and the viscosity.

When the point of termination of the reaction is decided by measuring the refractive index, for example, the following procedures are conducted.

Samples of the prepolymer are taken out at a plurality of reaction points during the prepolymerization in a manner such that refractive indices (nd) of the prepolymer comprising sulfur at the plurality of reaction points show different values.

The point of termination of the reaction can be decided based on the refractive index (nd) of the sample of the prepolymer comprising sulfur which does not show separation of sulfur when the sample is cooled at a temperature closed to the room temperature and provides a lens exhibiting excellent transparency as the final product after the rest of the polythiol compound is added and the polymerization is conducted.

The refractive index (nd) at the point of termination is set at a value smaller than the refractive index of the obtained plastic lens.

It is preferable that the heating is stopped and the temperature is rapidly lowered to a temperature closed to the room temperature when the refractive index (nd) of the prepolymer comprising sulfur is increased to the prescribed value which is set as the point of termination.

When the reaction is terminated, an acidic phosphoric acid ester or a halogenated tin compound such as dimethyltin dichloride and dibutyltin dichloride may be added in a suitable amount as the auxiliary agent for termination of the reaction so that the reaction is terminated completely.

The viscosity of the prepolymer comprising sulfur at the point of termination cannot be decided at a specific value since the viscosity is different depending on the concentrations of the compound having epithio group, sulfur and the portion of the polythiol compound which are used for the reaction. In general, it is preferable that the viscosity is 1 Pa·s (25° C.) or smaller since the operation of mixing with the rest of the polythiol compound which is added in the following step and the operation of casting into a mold are facilitated.

The step of polymerizing the prepolymer comprising sulfur and the rest of the polythiol compound in the process for producing a plastic lens of the present invention will be described in the following.

In the process for producing a plastic lens of the present invention, in general, the prepolymer comprising sulfur obtained as described above is mixed with the rest of the polythiol compound, and the polymerization is conducted.

As the rest of the polythiol compound, the same polythiol compound as that used for preparing the prepolymer comprising sulfur may be used, or a polythiol compound different from that used for preparing the prepolymer comprising sulfur may be used.

The rest of the polythiol compound may be used singly or in combination of two or more.

The amount of the entire polythiol compound is, in general, 0.1 to 95% by weight and preferably 10 to 90% by weight based on the amount of the entire raw materials used for producing the plastic lens.

The process for mixing the prepolymer comprising sulfur and the rest of the polythiol compound is not particularly limited as long as the components can be sufficiently mixed together. From the standpoint of suppressing undesirable reactions and facilitating the operation of casting without unnecessary increase in the viscosity, it is preferable that temperature of the mixing is, in general, −30 to 50° C. and preferably 0 to 30° C.

The time of the mixing is, in general, 5 minutes to 2 hours and preferably 5 to 15 minutes.

When the prepolymer comprising sulfur and the rest of the polythiol compound are mixed, a catalyst may be added to promote the polymerization.

Examples of the catalyst include amines, phosphines, quaternary ammonium salts, quaternary phosphonium salts, tertiary sulfonium salts, secondary iodonium salts, mineral acids, Lewis acids, organic acids, silicic acids and tetrafluoroboric acids.

Preferable examples of the catalyst among the above catalysts include amines such as aminoethanol, 1-aminopropanol, 2-aminopropanol, aminobutanol, aminopentanol and aminohexanol; and quaternary phosphonium salts such as tetramethylphosphonium chloride, tetramethylphosphonium bromide, tetraethylphosphonium chloride, tetraethylphosphonium bromide, tetra-n-butylphosphonium chloride, tetra-n-butylphosphonium bromide, tetra-n-butylphosphonium iodide, tetra-n-hexylphosphonium bromide and tetra-n-octylphohphonium bromide.

The amount of the catalyst used for the reaction is, in general, 0.0001 to 1.0% by weigh and, preferably, 0.001 to 1.0% by weight based on the amount of the entire raw materials used for producing the plastic lens.

It is preferable that the operation of degassing under a reduced pressure is conducted before, during or after mixing the prepolymer comprising sulfur, the rest of the polythiol compound, the catalyst and additives which are described below to prevent formation of bubbles during the cast polymerization.

The reduced pressure is, in general, in the range of about 0.1 to 50 mm Hg (0.013 to 6.67 kPa) and preferably in the range of about 1 to 20 mm Hg (0.133 to 2.67 kPa).

The quality of the plastic lens is improved when the obtained mixture or the components of the mixing which are the raw materials, the catalyst and the additives described below before being mixed are purified by removing impurities by filtration through a filter having pore diameters of about 0.2 to 20 μm.

Then, the mixture obtained above is cast into a mold made of glass or a metal, and the polymerization is conducted using an electric oven or the like.

The temperature of the polymerization is, in general, −10 to 150° C. and preferably 0 to 120° C.

The time of the polymerization is, in general, 1 to 72 hours and preferably 10 to 48 hours.

It is preferable that the product of the polymerization is treated by annealing, in general, at 50 to 150° C. and preferably at 80 to 130° C. for 10 minutes to 5 hours and preferably for about 30 minutes to 3 hours after the polymerization is completed to remove strains in the plastic lens of the present invention.

When the prepolymer comprising sulfur and the rest of the polythiol compound are mixed, various conventional additives may be added, where desired.

When the plastic lens obtained in accordance with the process of the present invention is not easily released from the mold after the polymerization has been completed, the property for releasing can be improved by using or adding a conventional external and/or internal mold release.

An ultraviolet light absorber may be added for the purpose of protecting the plastic lens or eyes from ultraviolet light, and an infrared light absorber may be added for the purpose of protecting eyes from infrared light. The amount of the absorber is, in general, about 0.03 to 3% by weight based on the amount of the entire raw materials used for producing the plastic lens although the amount is different depending on the ability of absorption and the maximum wavelength of absorption of the used additive.

The process of impregnating the obtained plastic lens with the above absorber may be used.

Antioxidants and light stabilizers may be added to prevent degradation of the plastic lens.

Bluing may be conducted using a very small amount of a coloring agent such as a bluish or reddish dye or pigment for the purpose of maintaining or improving the appearance of the plastic lens.

Photochromic dyes and antistatic agents may be added to provide the plastic lens with various other functions.

The above additives may be added when the compound having epithio group, sulfur and a portion of the polythiol compound are mixed as long as the addition causes no problems.

In particular, for an additive which can be added more easily at lower viscosities (for example, an ultraviolet absorber), it is preferable that the addition is conducted in the step of the preparation of the prepolymer comprising sulfur.

The plastic lens of the present invention may be treated by dying using a dye.

A cured coating film may be formed on the plastic lens using a coating fluid comprising an organosilicon compound or an acrylic compound to which fine particles of an inorganic substance such as tin oxide, silicon oxide, zirconium oxide and titanium oxide are added so that scratch resistance is improved.

It is preferable that an organosilicon compound is used since a cured coating film exhibiting excellent properties can be obtained.

A primer layer comprising a polyurethane as the main component may be formed between the plastic lens and the cured coating film described above so that impact resistance is improved.

An antireflection film comprising an inorganic substance such as silicon oxide, titanium dioxide, zirconium oxide, tantalum oxide and niobium oxide may be formed on the cured coating film described above so that the antireflection property can be provided.

A water repelling film comprising an organosilicon compound having fluorine atom may be formed on the antireflection film so that the water repelling property can be improved.

The yellowing factor ($\Delta YI$) of the plastic lens of the present invention obtained as described above is smaller than that of conventional plastic lenses, showing the excellent weatherability of the plastic lens of the present invention.

The refractive index of the plastic lens of the present invention is, in general, 1.65 to 1.80, and the Abbe number is, in general, 30 or greater.

The plastic lens of the present invention suppresses coloring and exhibits excellent transparency.

Since the plastic lens produced in accordance with the process of the present invention has a great refractive index and a great Abbe number, the plastic lens can be advantageously used for various optical products and, in particular, is suitable for spectacle lenses.

EXAMPLES

The present invention will be described more specifically with reference to Examples and Comparative Examples in the following. However, the present invention is not limited to the examples.

The physical properties of the obtained lenses were evaluated in accordance with the following methods.

(1) Refractive Index and Abbe Number

A samples piece for the measurement was cut out from a plastic lens, and the refractive index and the Abbe number were measured at 20° C. using a precision refractometer Type KPR-200 manufactured by KALNEW Co. Ltd.

The refractive index at the wavelength of 546.1 nm is represented by $n_e$, and the Abbe number is represented by $v_e$, which is the value given by $(n_e-1)/(n_F-n_C)$.

(2) Yellowing Factor ($\Delta YI$)

Using a plastic lens obtained in Example or Comparative Example which had substantially no dioptic power and had a thickness of 1.8 mm at the central portion as the sample, the weathering test was conducted using a xenon weathermeter (WEL-25AX-HC-BEC) manufactured by SUGA TEST INSTRUMENTS Co., Ltd. under the following condition:

Light source: an air-cooled 2.5 kW xenon arc lamp
Luminance of irradiation: 320 W/m² (the distance of irradiation: 254 mm; the wavelength of the measurement: 300~700 nm)
Time of the test: 96 hours as the maximum time Using plastic lenses before the weathering test and after the weathering tests for 24 hours, 48 hours, 72 hours and 96 hours, the spectroscopic transmittance was measured using a spectrophotometer manufactured by OTSUKA ELECTRONICS Co., Ltd. (the instantaneous multi-light measuring system, MCPD-3000). Three stimulus values X, Y and Z at the standard light C were obtained from the data obtained by the measurement, and the YI value was calculated in accordance with the following equation:

$$YI=100(1.28X-1.06Z)/Y$$

The difference in the YI values before and after the weathering test $\Delta YI$ was calculated for each time of weathering in accordance with the following equation:

$$\Delta YI = YI \text{ after the weathering test} - YI \text{ before the weathering test}$$

The smaller the value of $\Delta YI$, the smaller the yellowing.

(3) Transparency

A plastic lens was placed in a dark room under a table top fluorescence light with a black cloth at the background. The appearance of the plastic lens was examined by visual observation to find the presence or the absence of cloudiness.

Example 1

(a) Preparation of a Prepolymer Comprising Sulfur

Into a flask, 78.25 parts by weight of bis(β-epithiopropyl) sulfide as the compound having epithio group, 23.7 parts by weight of sulfur (manufactured by WAKO PURE CHEMICAL INDUSTRIES, Ltd.; flower of sulfur; the purity: 99% by weight) and 0.75 parts by weight of 2-(2-hydroxy-4-octyloxyphenyl)benzotriazole as the ultraviolet light absorber, the amounts being based on the amount of the entire raw materials used for preparing the prepolymer comprising sulfur, were placed and heated at 60° C. under a pressure of 10 mm Hg (1.33 kpa) to prepare a solution.

After the solution was prepared, the pressure was returned to 760 mm Hg (101.33 kpa), and 0.05 parts by weight of 2-mercapto-N-methylimidazole as the vulcanization catalyst and 2.5 parts by weight of bis(mercaptomethyl)-1,4-dithiane as the polythiol compound were added. After degassing by reducing the pressure to 10 mm Hg, the pressure was returned to 760 mm Hg with nitrogen gas. The reaction was allowed to proceed at 60° C. for 4 hours, and a prepolymer comprising sulfur was prepared.

The obtained prepolymer had a refractive index nd of 1.673 (60° C.).

To the obtained prepolymer comprising sulfur, 0.04 parts by weight of dibutyltin dichloride as the reaction modifier was added, and the temperature of the prepolymer was lowered to 30° C.

(b) Preparation of a Plastic Lens

A mixture of dibutoxyethyl acidphosphate and butoxyethyl acidphosphate as the internal mold release in an amount of 0.006 parts by weight, 0.001 part by weight of tetrabutylphosphonium bromide as the polymerization catalyst and 2.5 parts by weight of bis(mercaptomethyl)-1,4-dithiane as the polythiol compound were mixed together under stirring to form a uniform mixture. The obtained mixture was added to the prepolymer prepared above in (a), and the resultant mixture was mixed and degassed under a pressure of 10 mm Hg for 10 minutes under stirring.

After the pressure was returned to 760 mm Hg with nitrogen gas, the mixture was filtered through a TEFLON (a registered trade name) filter having a pore diameter of 1 μm and cast into a mold comprising a glass mold and a gasket.

The mold containing the cast mixture was slowly heated from 30° C. to 100° C. over 24 hours and kept at 100° C. for 1 hour so that the polymerization was allowed to proceed.

After the polymerization was completed, the mold was slowly cooled, and the formed resin was taken out of the mold.

To decrease strain formed in the obtained resin and stabilize the dioptic power of the lens, annealing was conducted by heating the resin at 100° C. for 1 hour and then slowly cooling the resin from the glass transition temperature of the resin to a temperature lower than 20° C., and a plastic lens was obtained.

The physical properties described above in (1) to (3) of the obtained plastic lens were measured and evaluated.

The result of the measurement of the yellowing factor is shown in Table 1.

As shown in Table 1, the value of ΔYI of the obtained plastic lens was 5.2 even after 96 hours, showing that the yellowing was suppressed. Cloudiness was absent, and the transparency was excellent.

The refractive index ne was 1.775 and the Abbe number ve was 31.0, showing that the optical properties were excellent.

Example 2

(a) Preparation of a Prepolymer Comprising Sulfur

A prepolymer comprising sulfur was prepared in accordance with the same procedures as those conducted in Example 1 (a) except that 1.0 part by weight of bis(mercaptomethyl)-1,4,-dithiane was added as the polythiol compound.

(b) Preparation of a Plastic Lens

A plastic lens was prepared in accordance with the same procedures as those conducted in Example 1 (b) except that 4.0 parts by weight of bis(mercaptomethyl)-1,4,-dithiane was added as the polythiol compound.

The physical properties described above in (1) to (3) of the obtained plastic lens were measured and evaluated in accordance with the same procedures as those conducted in Example 1.

The result of the measurement of the yellowing factor is shown in Table 1.

As shown in Table 1, the value of ΔYI of the obtained plastic lens was 5.0 even after 96 hours, showing that the yellowing was suppressed. Cloudiness was absent, and the transparency was excellent.

The refractive index ne was 1.755 and the Abbe number ve was 31.0, showing that the optical properties were excellent.

Example 3

(a) Preparation of a Prepolymer Comprising Sulfur

A prepolymer comprising sulfur was prepared in accordance with the same procedures as those conducted in Example 1 (a) except that 4.0 parts by weight of bis(mercaptomethyl)-1,4,-dithiane was added as the polythiol compound.

(b) Preparation of a Plastic Lens

A plastic lens was prepared in accordance with the same procedures as those conducted in Example 1 (b) except that 1.0 part by weight of bis(mercaptomethyl)-1,4,-dithiane was added as the polythiol compound.

The physical properties described above in (1) to (3) of the obtained plastic lens were measured and evaluated in accordance with the same procedures as those conducted in Example 1.

The result of the measurement of the yellowing factor is shown in Table 1.

As shown in Table 1, the value of ΔYI of the obtained plastic lens was 5.3 even after 96 hours, showing that the yellowing was suppressed. Cloudiness was absent, and the transparency was excellent.

The refractive index ne was 1.755 and the Abbe number ve was 31.0, showing that the optical properties were excellent.

Example 4

(a) Preparation of a Prepolymer Comprising Sulfur

A prepolymer comprising sulfur was prepared in accordance with the same procedures as those conducted in Example 1 (a) except that 2.0 parts by weight of bis(mercaptoethyl)sulfide was added as the polythiol compound.

(b) Preparation of a Plastic Lens

A plastic lens was prepared in accordance with the same procedures as those conducted in Example 1 (b) except that 2.0 parts by weight of bis(mercaptoethyl)sulfide was added as the polythiol compound.

The physical properties described above in (1) to (3) of the obtained plastic lens were measured and evaluated in accordance with the same procedures as those conducted in Example 1.

The result of the measurement of the yellowing factor is shown in Table 2.

As shown in Table 2, the value of ΔYI of the obtained plastic lens was 4.4 even after 96 hours, showing that the yellowing was suppressed. Cloudiness was absent, and the transparency was excellent.

The refractive index ne was 1.754 and the Abbe number ve was 31.5, showing that the optical properties were excellent.

Example 5

(a) Preparation of a Prepolymer Comprising Sulfur

A prepolymer comprising sulfur was prepared in accordance with the same procedures as those conducted in Example 4 (a) except that 1.0 part by weight of bis(mercaptoethyl)sulfide was added as the polythiol compound.

(b) Preparation of a Plastic Lens

A plastic lens was prepared in accordance with the same procedures as those conducted in Example 4 (b) except that 3.0 parts by weight of bis(mercaptoethyl)sulfide was added as the polythiol compound.

The physical properties described above in (1) to (3) of the obtained plastic lens were measured and evaluated in accordance with the same procedures as those conducted in Example 1.

The result of the measurement of the yellowing factor is shown in Table 2.

As shown in Table 2, the value of ΔYI of the obtained plastic lens was 4.9 even after 96 hours, showing that the yellowing was suppressed. Cloudiness was absent, and the transparency was excellent.

The refractive index ne was 1.754 and the Abbe number ve was 31.5, showing that the optical properties were excellent.

Example 6

(a) Preparation of a Prepolymer Comprising Sulfur

A prepolymer comprising sulfur was prepared in accordance with the same procedures as those conducted in Example 4 (a) except that 3.0 parts by weight of bis(mercaptoethyl)sulfide was added as the polythiol compound.

(b) Preparation of a Plastic Lens

A plastic lens was prepared in accordance with the same procedures as those conducted in Example 4 (b) except that 1.0 part by weight of bis(mercaptoethyl)sulfide was added as the polythiol compound.

The physical properties described above in (1) to (3) of the obtained plastic lens were measured and evaluated in accordance with the same procedures as those conducted in Example 1.

The result of the measurement of the yellowing factor is shown in Table 2.

As shown in Table 2, the value of ΔYI of the obtained plastic lens was 5.0 even after 96 hours, showing that the yellowing was suppressed. Cloudiness was absent, and the transparency was excellent.

The refractive index ne was 1.754 and the Abbe number ve was 31.5, showing that the optical properties were excellent.

Comparative Example 1

(a) Preparation of a Prepolymer Comprising Sulfur

Into a flask, 78.25 parts by weight of bis(β-epithiopropyl)sulfide as the compound having epithio group, 23.7 parts by weight of sulfur (manufactured by WAKO PURE CHEMICAL INDUSTRIES, Ltd.; flower of sulfur; the purity: 99% by weight) and 0.75 parts by weight of 2-(2-hydroxy-4-octyloxyphenyl)benzotriazole as the ultraviolet light absorber, the amounts being based on the amount of the entire raw materials for the prepolymer comprising sulfur, were placed and heated at 60° C. under a pressure of 10 mm Hg (1.33 kpa) to prepare a solution.

After the solution was prepared, the pressure was returned to 760 mm Hg (101.33 kpa), and 0.20 parts by weight of 2-mercapto-N-methylimidazole as the vulcanization catalyst was added. The reaction was allowed to proceed for 4 hours, and a prepolymer comprising sulfur was prepared.

The obtained prepolymer had a refractive index nd of 1.673 (60° C.).

To the obtained prepolymer comprising sulfur, 0.04 parts by weight of dibutyltin dichloride as the reaction modifier was added, and the temperature of the prepolymer was lowered to 30° C.

(b) Preparation of a Plastic Lens

A mixture of dibutoxyethyl acidphosphate and butoxyethyl acidphosphate as the internal mold release in an amount of 0.006 parts by weight, 0.001 part by weight of tetrabutylphosphonium bromide as the polymerization catalyst and 5.0 parts by weight of bis(mercaptomethyl)-1,4-dithiane as the polythiol compound were mixed together to form a uniform mixture. The obtained mixture was added to the prepolymer prepared above in (a), and the resultant mixture was mixed and degassed under a pressure of 10 mm Hg for 10 minutes under stirring.

After the pressure was returned to 760 mm Hg with nitrogen gas, the mixture was filtered through a TEFLON (a registered trade name) filter having a pore diameter of 1 μm. The filtered mixture was cast into a mold, and the polymerization was conducted under heating in accordance with the same procedures as those conducted in Example 1

After the polymerization was completed, the obtained resin was taken out of the mold and annealed in accordance with the same procedures as those conducted in Example 1, and a plastic lens was obtained.

The physical properties described above in (1) to (3) of the obtained plastic lens were measured and evaluated.

The result of the measurement of the yellowing factor is shown in Table 1.

As shown in Table 1, the value of ΔYI of the obtained plastic lens was 7.0 after 96 hours, showing that the yellowing was significant. With respect to the transparency, slightly more cloudiness was present in comparison with those in Examples 1 to 3.

The refractive index ne and the Abbe number ve were about the same as those of plastic lenses in Examples 1 to 3.

Comparative Example 2

(a) Preparation of a Prepolymer Comprising Sulfur

A prepolymer comprising sulfur was prepared in accordance with the same procedures as those conducted in Comparative Example 1 (a).

(b) Preparation of a Plastic Lens

A plastic lens was prepared in accordance with the same procedures as those conducted in Comparative Example 1 (b) except that 4.0 parts by weight of bis(mercaptoethyl)sulfide was added as the polythiol compound.

The physical properties described above in (1) to (3) of the obtained plastic lens were measured and evaluated in accordance with the same procedures as those conducted in Example 1.

The result of the measurement of the yellowing factor is shown in Table 2.

As shown in Table 2, the obtained plastic lens exhibited a value of $\Delta YI$ of 6.2 after 96 hours, showing that the yellowing was significant. With respect to the transparency, slightly more cloudiness was present in comparison with those in Examples 4 to 6.

The refractive index ne and the Abbe number ve were about the same as those of plastic lenses in Examples 4 to 6.

TABLE 1

|  | Example | | | Comparative |
| --- | --- | --- | --- | --- |
|  | 1 | 2 | 3 | Example 1 |
| Preparation of prepolymer (part by weight except temperature and time) | | | | |
| compound having epithio group | 78.25 | 78.25 | 78.25 | 78.25 |
| sulfur $S_8$ | 23.7 | 23.7 | 23.7 | 23.7 |
| polythiol compound | 2.5 | 1.0 | 4.0 | 0 |
| vulcanization catalyst (2-mercapto-N-methylimidazole) | 0.05 | 0.05 | 0.05 | 0.20 |
| ultraviolet light absorber | 0.75 | 0.75 | 0.75 | 0.75 |
| reaction modifier | 0.04 | 0.04 | 0.04 | 0.04 |
| temperature of reaction (° C.) | 60 | 60 | 60 | 60 |
| time of reaction (hr) | 4 | 4 | 4 | 4 |
| Polymerization (part by weight) | | | | |
| polythiol compound | 2.5 | 4.0 | 1.0 | 5.0 |
| polymerization catalyst | 0.001 | 0.001 | 0.001 | 0.001 |
| internal mold release | 0.006 | 0.006 | 0.006 | 0.006 |
| Weatherability $\Delta YI$ (xenon weathermeter) | | | | |
| after 0 hour | 0.0 | 0.0 | 0.0 | 0.0 |
| after 24 hours | 1.4 | 1.4 | 1.5 | 2.0 |
| after 48 hours | 2.3 | 2.2 | 2.1 | 3.1 |
| after 72 hours | 4.0 | 4.1 | 4.2 | 5.0 |
| after 96 hours | 5.2 | 5.0 | 5.3 | 7.0 |

TABLE 2

|  | Example | | | Comparative |
| --- | --- | --- | --- | --- |
|  | 4 | 5 | 6 | Example 2 |
| Preparation of prepolymer (part by weight except temperature and time) | | | | |
| compound having epithio group | 78.25 | 78.25 | 78.25 | 78.25 |
| sulfur $S_8$ | 23.7 | 23.7 | 23.7 | 23.7 |
| polythiol compound | 2.0 | 1.0 | 3.0 | 0 |
| vulcanization catalyst (2-mercapto-N-methylimidazole) | 0.05 | 0.05 | 0.05 | 0.20 |
| ultraviolet light absorber | 0.75 | 0.75 | 0.75 | 0.75 |
| reaction modifier | 0.04 | 0.04 | 0.04 | 0.04 |
| temperature of reaction (° C.) | 60 | 60 | 60 | 60 |
| time of reaction (hr) | 4 | 4 | 4 | 4 |
| Polymerization (part by weight) | | | | |
| polythiol compound | 2.0 | 3.0 | 1.0 | 4.0 |
| polymerization catalyst | 0.001 | 0.001 | 0.001 | 0.001 |
| internal mold release | 0.006 | 0.006 | 0.006 | 0.006 |
| Weatherability $\Delta YI$ (xenon weathermeter) | | | | |
| after 0 hour | 0.0 | 0.0 | 0.0 | 0.0 |
| after 24 hours | 1.2 | 1.3 | 1.2 | 2.1 |
| after 48 hours | 2.0 | 2.0 | 1.9 | 3.0 |
| after 72 hours | 3.7 | 3.5 | 3.5 | 4.9 |
| after 96 hours | 4.4 | 4.9 | 5.0 | 6.2 |

INDUSTRIAL APPLICABILITY

In accordance with the process of the present invention, a plastic lens which exhibits excellent weatherability in combination with a great refractive index, a great Abbe number and excellent transparency can be obtained.

The obtained plastic lens is advantageously used as the plastic lens for spectacles.

The invention claimed is:

1. A process for producing a plastic lens which comprises preparing a prepolymer comprising sulfur by bringing at least one compound having an epithio group, sulfur and a portion of a polythiol compound into reaction with each other and, thereafter, adding the rest of the polythiol compound to the prepared prepolymer comprising sulfur and allowing polymerization to proceed;

wherein the at least one compound having an epithio group is bis(β-epithiopropyl) sulfide, bis(β-epithiopropyl)disulfide, bis(β-epithiopropyl)ether, bis(β-epithiopropyl) methane, 1,2-bis(β-epithio-propyl)ethane, 1,3-bis(β-epithiopropyl)propane, 2,5-bis(β-epithiopropyl)-1,4-dithiane, 1,3- and 1,4-bis(β-epithiopropyl) cyclohexanes, 1,3- and 1,4-bis(β-epithiopropyl) benzenes, bis[4-(β-epithiopropylthio)phenyl]sulfide, or bis[4-(β-epithiopropylthio)cyclohexyl]sulfide;

wherein the polythiol compound is at least one of bis(mercaptomethyl)-1,4-dithiane, bis(mercaptoethyl) sulfide, bis(mercaptoethyl)disulfide, 1,2-bis(mercaptoethyl) thio-3-mercaptopropane, pentaerythritol tetrakismercaptoacetate, pentaerythritol tetrakismercaptopropionate, trimethylolpropane trismercaptoacetate, trimethylolpropane trismercaptopropionate, or trimercaptopropane;

wherein the at least one compound having an epithio group in the preparing of the prepolymer comprising sulphur is present in an amount from 70 to 95% by weight based on the amount of the amount of the entire raw materials in the preparing of the prepolymer comprising sulfur; and wherein the portion of the polythiol compound in the preparing of the prepolymer comprising sulfur is present in an amount of 10 to 90% by weight based on the amount of the entire polythiol compound used for preparing the plastic lens.

2. The process for producing a plastic lens according to claim 1, wherein the prepolymer comprising sulfur is prepared by bringing at least one compound having an epithio group, sulfur and a portion of a polythiol compound into reaction with each other in presence of a vulcanization catalyst.

3. The process for producing a plastic lens according to claim 2, wherein the vulcanization catalyst is at least one imidazole-based catalyst selected from 2-mercapto-N-methylimidazole, imidazole, N-methylimidazole, 2-methylimidazole, 4-methylimidazole, N-ethylimidazole, 2-ethylimidazole, 4-ethylimidazole, N-butylimidazole, 2-butylimidazole, 4-butylimidazole, N-phenylimidazole, 2-phenylimidazole, N-benzylimidazole, 2-benzyl-imidazole, 2-mercaptoimidazole and 2-mercaptobenzimidazole.

4. The process for producing a plastic lens according to claim 2, wherein the vulcanization catalyst is at least one thiuram-based catalyst selected from tetramethylthiuram disulfide and tetramethylthiuram monosulfide.

5. The process for producing a plastic lens according to claim 2, wherein the vulcanization catalyst is at least one guanidine-based catalyst selected from diphenylguanidine and di-o-tolylguanidine.

6. The process for producing a plastic lens according to claim 2, wherein the amount of the vulcanization catalyst is within a range of 0.001 to 5.0% by weight based on the entire amount of raw materials for preparing the prepolymer comprising sulfur.

7. The process for producing a plastic lens according to claim 1, wherein the reaction for preparing the prepolymer comprising sulfur is terminated when the refractive index is increased to a prescribed value which is smaller than the refractive index of the plastic lens.

8. The process for producing a plastic lens according to claim 1, wherein the temperature in the reaction for preparing the prepolymer comprising sulfur is higher than the temperature in the polymerization of the prepolymer comprising sulfur and the rest of the polythiol compound.

9. A plastic lens produced in accordance with a process described in claim 1.

* * * * *